United States Patent Office 3,522,145
Patented July 28, 1970

3,522,145
DEODORIZATION OF FATS
George N. Apostolatos, New York, N.Y., and Adolph Renold, Somerset, N.J., assignors to Colgate-Palmolive Company, New York, N.Y., a corporation of Delaware
No Drawing. Filed July 20, 1966, Ser. No. 566,485
Int. Cl. C12b 1/00
U.S. Cl. 195—3
25 Claims

ABSTRACT OF THE DISCLOSURE

Rendered fat is improved in color and odor by the steps of:
(a) Mixing said fats with an enzyme containing substance comprising proteolytic enzyme which is active at the pH and temperature of the fat in a molten state; and
(b) Mixing with the enzyme-treated molten fat a deodorizing composition comprising a fat-soluble strong acid and a carbohydrate.

---

The present invention relates in general to the purification of fats and oils, and more particularly, to a process for deodorizing fats and oils used in the production of soap. This invention is especially useful for the treatment of low-grade fatty materials comprising, for example, fat from beef, mutton, pork, chicken or coconuts. Soaps produced from such treated fats are substantially, if not completely free of malodors, and remain pleasant smelling over prolonged periods.

Numerous prior methods of deodorizing crude oils and fats are based on the attempted removal of malodorous components. In earlier used processes, for example British Pat. No. 16,954, steam stripping is used. This step is supplemented in British Pat. No. 8,854, by clarifying the resultant fat by heating it in the presence of sulfuric acid.

It is also conventional to remove from fats suspended and dissolved matter comprising meat scraps, proteinaceous matter, carbohydrates, and certain phosphatides by heating the fat either in the presence of an adsorbent or an acid, such as sulfuric or phosphoric acid (H. G. Kirschenbauer, "Fats and Oils," Second Edition 72, Reinhold Publishing Company, New York, 1960). In the event the latter acid process is used, the mixture of fat and acid is heated to about 100° C. for a short time and is followed by settling and removal of the acid layer.

Though the foregoing methods of refining raw fats and oils have sought to improve the odor of these materials, the odoriferous impurities were not satisfactorily removed, and an impasse was reached as to what further treatment was necessary. From the methodological standpoint, the solution to the problem of reducing the content of odor-yielding substances has been stymied because the composition of many odoriferous bodies is unknown. Available analytical tests are incapable of determining the origin of all the deleterious odors, and in particular, whether the odor-forming bodies in animal fats are derived from particular fatty acid constituents of the fat or from possible trace amounts of bone and/or proteinaceous materials therein.

Although methods have been proposed heretofore for separating bone, proteins, and fats, these methods are used in the rendering of animals wherein the object is to recover separate fractions and not to eliminate trace impurities, much less malodorous trace impurities in any of the fat, bone or protein fractions. For example, in an enzymatic rendering process ("The National Provisioner," vol. 145, No. 21, p. 18, Nov. 18, 1961), only mild conditions of enzymatic degradation of the animal carcasses are utilized to minimize damage to the fats and protein fractions which are subsequently separated by centrifugation.

A particularly serious disadvantage in any of the above-described methods of refining animal and vegetable derived fats is that soaps produced therefrom retain objectional malodors. Moreover, even freshly prepared fat-derived soaps of high quality with a pleasant odor may emanate malodors after commercially unavoidable periods of storage. Therefore, it has heretofore been necessary to perfume strongly fat-derived soaps to cover the odor introduced by malodor precursors even after the soaps have been specially treated to remove odoriferous materials therefrom.

It is therefore a principal object of the invention to provide a process of refining animal and vegetable fats to improve the odor thereof.

It is another object of this invention to provide an improved process of treating animal and vegetable fats to effectively remove the odoriferous materials therefrom and to improve the perfume stability of the soaps made therefrom.

A further object of the invention is to provide an improved process of removing from animal and vegetable fats precursors of undesirable odor bodies therein.

A still further object is to provide novel compositions of matter used in such processes.

It is yet another object of this invention to provide a pleasant smelling fat-derived soap which remains free of malodors even after long periods of storage.

These and other objects and advantages of the invention will become apparent by reference to the following description and appended claims.

It has been found that objectional odors of commercial grades of animal and vegetable fats appear to be caused by relatively small amounts of nitrogen-containing compounds which are probably of a proteinaceous character. For example, a nitrogen analysis of a raw animal fat, determined by the Kjeldahl method, revealed that the total nitrogen present therein corresponded to a protein content of 0.02% by weight. These proteinaceous impurities, together with known odor-forming bodies, such as aldehydes, ketones, and alcohols, contribute to the unpleasant smell of such fats. Even though these odor-forming bodies are present in trace amounts, more or less, they cooperate, especially when in combination, to create penetrating and highly objectionable odors which, of necessity, must be masked by the addition of large amounts of perfume when soaps are produced therefrom.

It has been discovered that the odor-forming bodies in inexpensive crude fats and oils can be successfully eliminated by the process of the present invention which includes an enzymatic or chemical treatment of the fats, and preferably a combination of the two.

The enzymatic treatment comprises treating molten crude animal fats and vegetable-derived oils with an enzyme. Whereas the prior-described enzyme treatment was concerned with removing a protein fraction from animal carcasses, the present invention is directed to an after-treatment of fat previously separated from the meat and bone scraps by rendering processes. That is, the present enzymatic treatment of fat is designed to degrade decomposed proteinaceous materials rather than leaving them substantially intact as in prior methods. The enzyme converts a substantial portion of malodorous impurities into either soluble, volatile, or readily adsorbable materials.

The pH of the enzyme solution advantageously corresponds to the acidity of the fat, the latter being determined by measuring the pH of water in contact-equilibrium with the fat. The pH of the enzyme solution can be adjusted by the addition of either acid or base, e.g., HCl or NaOH. Since the process is conducted with molten fat which is normally acidic, the enzyme utilized should be active at a temperature at least as high as the melting point of the fat, preferably from 30–75° C., more preferably 50–60° C., and at a pH range of preferably from 3.5–7, and more preferably 4.5–5.5.

When lower melting point fats are deodorized, the enzyme need not be active at higher temperatures. For example, when coconut oil is deodorized according to the present invention, an enzyme can advantageously be chosen which exhibits optimum activities at temperatures in the range of 20 to 30° C.

With respect to the type of enzyme that can be employed in this invention, it is particularly advantageous to employ proteolytic enzymes which are comparatively active at the temperature and pH of the fat and which retain considerable catalytic activity in the presence of heavy metal impurities. Such enzymes include, for example, ficin, papain, bromelin, fungal protease derived from *Aspergillus orvzae*, and enzymes derived from bacterial flora of grease traps or septic tanks. The preferred class of enzymes is endopeptidases, but exopeptidases and mixtures of endo and exopeptidases are also useful in this connection. Simple tests are available that can be used to determine the relative degree of practical utility of any given enzyme.

Industrial enzymatic deodorization is carried out best at a temperature at which the oil, fat or fatty mixture is at least semi-liquid and, preferably, completely molten. Therefore the temperature and pH range in which an enzyme or enzyme mixture shows optimum activity is determined by a procedure based on any of the many standard tests (e.g., Anson's Haemoglobin Method for Proteolytic Activity, Journal of General Physiology 22, 79, 1939, or the National Formulary's Method for Proteolytic Activity in Pancreatin, the National Formulary, Tenth Edition, Washington, D.C., 1955 U.S.P. XIV or Sandstedt, Kneen and Blish's Method for Alpha-Amylase, Cereal Chemistry 16, 712 (1939) or Boissonas' Method for Lipase Activity, Helvetica chimica Acta 31, 157, 1948, etc.).

Having selected an enzyme which is active at the temperature and at the acidity of the molten fat to be deodorized, the enzyme can be further evaluated by adding 5 parts of water containing 0.001 to 0.1 part of enzyme plus sequestrants, emulsifiers, antioxidants, salts, etc., as may be required for maximum enzyme activity to 100 parts molten fat and the mixture stirred overnight at constant temperature. Two parts of bleach mixture (clay plus charcoal) are then added, the temperature gradually increased to 115–125° C., and stirring continued for 20 minutes whereupon the mixture is filtered. The filtrate is then evaluated for filtrability, color and odor; the odor determinations are made organoleptically or by any of the known instrumental methods.

Since enzymatic reactions proceed at somewhat slow rates, it is often desirable to stimulate enzyme activity by admixing activators therewith. For example, proteolytic enzymes of plants are activated by a sulfhydro compound, cyanides, sodium bisulfite, hydrogen sulfide and other sulfides, it being often desirable to add such activators to the enzyme solution before the solution is admixed with the fat. The enzyme activity can also be accelerated by using an appropriate coenzyme. The choice of enzyme activator or promoter depends on the compatibility thereof with the fat, and generally any activator, specific for the enzyme employed, can be advantageously incorporated in the enzyme solution.

In commercial grades of tallow, there is usually present about 30 p.p.m. of iron and up to one p.p.m. of copper. These and other heavy metal impurities can have either a stimulating or inhibiting effect on enzymes; consequently, the type and amount of metal impurities present in the fat control, to some extent, the type of enzyme used. It is preferable to select an enzyme whose activity will not be retarded in the presence of trace amounts of such heavy metals.

Chelating agents, such as disodium-dihydrogen versenate, are conventionally used to convert metals into weakly dissociated complexes, thereby reducing the effect of said metals on the enzyme. When the type and/or amount of metal impurities in the fats diminish the activity of the enzyme, it is advantageous to employ a chelating agent in the enzyme solution to tie up the metals which deleteriously affect enzyme activity. Of course, the type and amount of chelating agent employed depends upon the amount and type of the metallic impurities present in the fat. Generally, any chelating agent which complexes with the undesired metals can be used.

With respect to the lower limit, any finite amount of enzyme will normally result in a finite improvement in odor removal. The enzyme desirably constitutes from about 0.001 to 0.1% by weight of the fat treated.

In general, the amount of any particular enzyme to be added to the fat will depend upon the type and amount of malodorous impurity. In this connection, experiments have unexpectedly shown that added protein, introduced by excess enzyme, particularly that fraction which is not removed by the bleach treatment contributes to undesired malodor and off-color of the fat when saponified. Consequently, excess enzyme must be avoided.

An effective amount of enzyme will not be in excess, and therefore will reduce malodor of the fat without deleteriously affecting its color when saponified (saponification color). In other words, since certain amounts of enzyme can satisfactorily effect a reduction in the malodor without an undue increase in the saponification color, the effective amount of enzyme to be used will be dependent, in any particular case, on an acceptable level of malodor combined with an acceptable saponification color. A low saponification color being most desirable. Selection of the effective amount of anzyme to be added to the fat in any given enzyme-fat system can therefore be determined routinely as in Example 6 by measuring the reduction of malodor and effect of the color of the saponified fat with varying amounts of enzyme.

If a carrier for the enzyme, such as water, is used. it constitutes preferably from 3 to 10, more preferably 5 to 6% by weight of the fat. Although water is the preferred carrier for the enzyme, other enzyme carriers, such as glycerol or alcohol can also be used to bring the enzyme into intimate contact with the odor-forming bodies in the fat. Depending upon the character of the enzyme, it may be desirable to use a mixture of water and other solvent as a carrier for the enzyme. The primary criterion in the selection of the carrier is that it is relatively inert to and compatible with the enzyme and fat at the prevailing temperature and pH, and easily removed prior to bleaching.

A carrier for the enzyme is used to bring the enzyme in an active state into intimate contact with the malodorous substances. Since the carrier is desirably removed from the fat during or after the enzyme treatment, it is advantageous to optimize the deodorization process by minimizing the amount of carrier added to the fat. Sufficient activity and contact of the enzyme can be attained by using a carrier constituting less than about 10% preferably about 5% by weight of the fat. Since aqueous enzyme solutions are relatively immiscible with molten tallow and other fatty materials, it is desirable to ubiquitously disperse the solution into the fat to obtain a more reactive mixture. Nonionic emulsifiers are particularly suitable for this purpose and preferably constitute from 0.05 to 0.2% by weight of the enzyme solution. Other emulsifiers of the cationic and anionic type can also be used, but in general, the nonionic emulsifiers are preferred. The emulsifiers function in the normal manner; therefore, any dispersing agent can be used which is compatible with the enzyme-fat mixture under the reaction conditions. Specific preferred examples of such emulsifiers are nonylphenoxy poly(ethyleneoxy)-ethanol (Igepal C0730 by General Aniline & Film Corp.), polyoxyethylene sorbitan monostearate (Tween 60 by Atlas Chemical Industries), ethoxylated straight chain alcohols with 10–18 carbons (Alfonic Ethoxylates by Continental Oil Company).

Normally, the enzyme solution described hereinbefore is added to the molten fatty material and the resulting emulsion is stirred until the enzymatic reaction is completed, generally for periods in the neighborhood of 2 to 12 hours. Thereafter, the temperature of the emulsion can be elevated above the boiling point of the aqueous medium to vaporize residual water. An adsorbent, such as bleaching clay and/or charcoal can also be added to the fat. The overhead vapors are found to contain considerable malodors, probably formed from protein fragments. After filtering the practically anhydrous fat mixture, a clear fat having up to 90% less malodors than fats treated only with a clay-carbon mixture is obtained.

It has also been discovered that the smell of crude commercial fats, as well as the enzymatically refined fats can be improved by treating the same with a novel deodorizing composition which includes a mixture of a fat-soluble strong acid and a carbohydrate, said mixture being preferably used with an acidic clay. These components, when employed in combination, are found to act synergistically in converting the odor-forming bodies in fats into volatile and readily adsorbable materials.

The acid should be soluble at the melting point of the fat, preferably to the extent of at least 0.5 g. per 1000 g. of fat. Although any fat-soluble acid can be used having these characteristics, it is desirable to employ an acid which will not adversely affect the color of the fat and which has a relatively low vapor pressure at the temperatures at which the molten tallow is processed. The acids found particularly suitable include α-sulfopalmitic acid, α-sulfostearic acid, mucochloric acid, acetylene dicarboxylic acid, maleic acid, and the alkyl dihydrogen phosphates, such as amyl dihydrogen phosphate and lauryl dihydrogen phosphate.

The deodorizing composition includes carbohydrates, such as starch and/or sugar, preferably having at least one free hydroxyl group. The carbohydrate generally comprises from 5 to 15, preferably about 9% by weight of the deodorizing composition.

Without being bound by an explanation of the mechanism of the action of the constituents of the deodorizing composition with impurities in the fat, it is believed that the fat-soluble acid serves both to hydrolyze protein fragments to components which become steam distillable or resinify under the influence of acidity, steam and temperature. It is also possible that the carboxyl portions of the protein-like hydrolyzate reacts with the hydroxyl groups of the carbohydrate. In the event sugars having a terminal aldehyde group are used as the carbohydrate, there may be a condensation of the amino group of the amino acids with the aldehyde moiety of the sugar. Functional groups of amino acids, other than the amino group, can also react with sugars. The combination of fat-soluble strong acid and carbohydrate functions synergistically to hydrolyze and convert the odor-forming bodies, as well as the potential odor-yielding bodies, into both steam-strippable fragments and other fragments which are readily removable by adsorption on acidic clay.

Among the numerous carbohydrates suitable for use in the synergistic composition, it is desirable to use modified and unmodified polysaccharides, such as etherified corn starch, etherified potato starch or regular corn starch. The odor of the fats is also improved when the carbohydrate is a monosaccharide, such as a pentose or hexose, or else, a disaccharide, such as maltose or sucrose. It is believed that the added carbohydrates are at least partially hydrolyzed by the fat-soluble acid into mono- and disaccharides. The free hydroxyl groups of the carbohydrates then react with the amino acid hydrolyzates in the acid media and the resulting compounds can be more easily separated from the fat.

The protein fragments and carbohydrates adducts of lower volatility which remain in the fat after steam stripping are adsorbed onto an acid clay which forms a part of the deodorizing composition. Suitable clays include bentonite, montmorillonite, kaolin, and other naturally occurring acidic clays. In some cases, it is desirable to use acid-activated clays to increase the adsorption thereof. Acid activation is normally accomplished by treating a slurry of clay and water with a mineral acid, such as hydrochloric or sulfuric acid. The mixture is then treated with steam for a period of about 5 to 6 hours and is thereafter washed and filtered. The teachings of U.S. Pat. No. 3,052,701 are incorporated herein by reference. Reference is also made to Kirk-Othmer "Encyclopedia of Chemical Technology," First Edition, vol. 4, page 55 (1954), for a further description of artificially acid-activated clays.

In addition to the removal of odoriferous materials from the fats, the acid clays also aid in the physical filtration and removal of extraneous colloidal matter. Fats having an objectionable color are also beneficially treated with acid clays which generally constitute from 0.5 to 10%, preferably 0.5 to 3% by weight of the fat being treated.

When the fatty material to be deodorized contains relatively large amounts of undesirable heavy metals which have not been previously eliminated, it is desirable to use a sequestering agent to reduce the activity of the metal ion to a level sufficiently low for the ion to be considered essentially inactive. Sequestering agents are found particularly desirable when deodorizing crude animal-derived fats which usually contain iron, and traces of copper and other heavy metals. These metal impurities are believed to catalyze the potentially odor-yielding materials to form odor-forming bodies; consequently, a reduction in the activity of these metallic ions in the tallow correspondingly reduces their effect in producing odor-forming bodies.

The sequestering agents found particularly suitable are the alkali salts of ethylenediaminetetracetic acid, sodium α-glucoheptonate, hydroxyethyl ethylene diamine tetracetic acid trisodium salt (=Versenol 120 by Dow) and other sequestering agents which will reduce the activity of the particular metallic ions in the fat. When the fatty material contains a particularly high concentration of an undesirable metal, the sequestering agent used is preferably selective for that particular metal impurity under the reaction conditions.

In the production of soaps from fatty materials, it is conventional to add to tallow varying amounts of vegetable oils, such as coconut oil. Therefore, the amount of the deodorizing composition added to the crude fats can be varied, depending upon the type of fat being used and the quantity of impurities therein. In any event, the deodorizing composition generally comprises 0.5 to 3%, preferably 0.8 to 1.2% by weight of the fat mixture being treated.

Generally, the deodorizing composition includes 2 to 10%, preferably 4 to 5% by weight of a fat-soluble strong acid, 3 to 15, preferably 8 to 10% by weight of a carbohydrate, the balance being an acidic clay.

The deodorizing composition is added to either crude fats or enzyme-treated fats which are in the liquid phase. Then, steam and an inert gas, such as nitrogen, are passed through the resulting mixture, the temperature of the fat being elevated to the range of between 100 to 125° C. The fat is thus treated, while stirring, for 0.5 to 2 hours or until the malodors are removed, and then a small amount of base, e.g., sodium hydroxide solution, is added to neutralize the fat soluble acid and the clay.

The steam serves to heat the molten fat and carry away vaporized odor-forming bodies therefrom in vacuo or at atmospheric pressure. If no vacuum equipment is available, it is desirable to pass a small amount of nitrogen through the fat during steaming to blanket the fat and reduce contact thereof with the oxygen of the air. A carbon dioxide or nitrogen stream may replace the steam in whole or in part, and in such instances, the temperature of the fat can be elevated above 125° C.

After the foregoing deodorization treatment is completed, it is desirable to add a mixture, such as clay and charcoal to the fat to aid in decolorizing the same.

The deodorizing process described hereinbefore is generally applicable for materials consisting essentially of vegetable and animal fats, and in particular to such materials which contain less than about 0.009%, preferably less than 0.003% protein nitrogen (as determined by the Kjeldahl method). By animal fat is meant fat previously rendered from different animal species, preferably avian and mammalian species. The deodorizing process of this invention is particularly applicable for removing malodors from crude animal fats obtained from slaughter houses and butcher shops; these fats normally containing small amounts of proteinaceous material.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

To 1500 g. crude coconut oil, there were added at 33–35° C., 150 cc. of an aqueous solution (pH adjusted to 5 with HCl) containing 15 mg. ficin enzyme derived from the latex of fig trees, 150 mg. of sodium bisulfite, and 1.5 g. of nonylphenoxypoly (ethyleneoxy)-ethanol, Igepal CO 730 by General Aniline and Film Corp. a non-ionic emulsifier. The resulting emulsion was stirred for 6 hours at 33–36° C., and then heated to 98° C. while 30 g. of a mixture of 6 parts by weight of bleaching clay and 1 part by weight of charcoal were added thereto. After stirring for one hour at 98–102° C., the mixture was filtered and a practically colorless oil was obtained. The oil produced was found to have only about ⅓ as much malodor as the same oil treated with 2% of the same clay-carbon mixture.

EXAMPLE 2

In this experiment, the enzyme solution was prepared from 75 cc. of water containing 75 mg. of papain enzyme, derived from the latex of the fruit of Carica papaya, 750 mg. of disodium-dihydrogen versenate sequesterant, and 1.5 g. Igepal CO 730 nonionic emulsifier. The pH of this solution was adjusted to 5.2 with HCl, and it was then added at 65–70° C. to 1500 g. of industrial grade molten tallow. The resultant emulsion was stirred for 6 hours at 65–70° C. and 30 g. of a clay-carbon bleach was added and the temperature gradually raised to 115° C. The mixture was stirred at 115–125° C. for one hour, and the now anhydrous fat was filtered. A clear colorless tallow was obtained having half the malodors of the same tallow treated with 2% of the same clay-carbon mixture.

EXAMPLE 3

In this example, the enzyme solution was prepared by mixing 150 cc. of water with 15 mg. of a mixed enzyme derived from the bacterial flora of grease tanks and septic tanks (Takamine KST from the Miles Company), 150 mg. of sodium bisulfite and 1.5 g. Igepal CO 730 nonionic emulsifier. This aqueous enzyme solution was added at 40–45° C. to 1500 g. of a fat containing 80% by weight of tallow and 20% by weight of coconut oil. After treating the emulsion as in Example 2, it was after-treated with a 2% clay-carbon bleach. The resulting clear and colorless filtrate had about 50% less malodors than the same fat mixture treated with 2% clay-carbon mixture.

EXAMPLE 4

To the fat, treated enzymatically at a temperature of 65–70° C. from Example 2 above was added 1% of the following composition:

| | Parts |
|---|---|
| α-Sulfostearic acid | 45 |
| Etherified potato starch | 90 |
| Natural acidic Texas bentonite | 860 |

Nitrogen was passed through the stirred mixture and the temperature of the fat raised to 114–116° C. Stirring continued for one hour, and thereafter 1.0% of 11° Bé. sodium hydroxide solution was added (1.0% of the fat present). The fat was stirred for an additional 20 minutes whereupon 2% plant bleach (2% of the fat present) was added thereto and stirring was continued at 114–116° C. for 30 minutes. The now anhydrous mixture was filtered and the resulting fat product exhibited 90% less malodors than fat treated with 2% clay-carbon mixture.

Although the ingredient fat was of poor odor quality, the clear filtered fat was of relatively good color and remarkably free of malodors. Toilet soap chips made from this fat had less malodors and rancidity than any other commercial chips found on the market.

EXAMPLE 5

In this example, untreated raw fats are deodorized. To 1000 parts by weight of a molten mixture of 80% crude tallow and 20% crude coconut oil, there was added with slow stirring 5 parts by weight of a powdered mixture having the following composition:

| | Percent |
|---|---|
| α-Sulfostearic acid | 5.0 |
| Modified potato starch | 10.0 |
| Sodium α-glucoheptanate sequesterant | 2.7 |
| Kaolin | 82.3 |

Steam was passed through the resulting mixture for one hour while the temperature was maintained at 100–130° C. The acidity of the mixture was then reduced by adding 1.5 parts by weight of 22° Bé. sodium hydroxide solution at 90–100° C. Then, 15 parts by weight of a standard mixture of clay and charcoal was added to the solution and the mixture was stirred for 20 minutes at 100–120° C. and filtered.

The product fat was of a good color, odor and stability and low in heavy metals, such as iron. This fat was found to exhibit less malodors than fat treated with only 2% of the same clay-carbon mixture, but was not as odorless as it would have been, if it had been pre-treated with enzymes as illustrated in Examples 1–4.

EXAMPLE 6

In this example, a series of tests were made to determine the effective amount of papain enzyme necessary to reduce the malodor of tallow to an acceptable level without deleteriously affecting the color thereof.

To 1000 parts by weight of industrial tallow was added at 55–60° C. with stirring a mixture having the following composition:

| | Parts by wt. |
|---|---|
| Water | 50 |
| Versenate sequesterant | 0.5 |
| Igepal CO 730 non-ionic emulsifier sufficient hydrochloric acid to adjust the pH of the resultant solution to 4.5 | 1.0 |

Recrystallized papain having a protein content of 98.8% as determined by the Kjeldahl analysis and in the form of an 0.05 M suspension in sodium acetate, pH 4.5, was then added and the resultant emulsion of water in oil was stirred overnight at 55–60° C. The temperature of the emulsion was then raised to 115° C. and heating continued until the fat became anhydrous (clear) whereupon 20 parts of a clay-carbon bleach mixture was added.

Stirring was continued for 20 min. at 115° C. and the mixture filtered. The filtrate was analyzed for malodor and the color of the oil before and after saponification was also determined. The results of these tests are shown in Table I.

point 75 cc. of the same enzyme solution as described in Example 8 was added and the resulting mixture stirred overnight at 60–65° C. Then 30 grams clay-carbon bleach were added and the temperature gradually raised to 115° C. The mixture was stirred at 115–125° C. for 30 min- TABLE I.—DEODORIZATION OF INDUSTRIAL TALLOW WITH RECRYSTALLIZED PAPAIN ENZYME, DISPERSED IN BUFFER, FOLLOWED BY A 2% CONVENTIONAL CARBON-CLAY BLEACH

| | | Color in 5¼" Lovibond tintometer | | | |
|---|---|---|---|---|---|
| Run | Treatment | Oil as is | | Saponified oil | Malodor |
| 1 | 2% bleach—No water | 1.4R | 9Y | 12.0R 70Y | 2.5 |
| 2 | 10% water only followed by 2% bleach | 1.4R | 10Y | 12.2R 70Y | 2.25 |
| 3 | 10% water containing 0.001% papain followed by 2% bleach | 1.4R | 13Y | 11.5R 70Y | 1.25 |
| 4 | 10% water containing 0.005% papain followed by 2% bleach | 1.7R | 10Y | 8.6R 50Y | ¹1.0 |
| 5 | 10% water containing 0.06% papain followed by 2% bleach | 2.0R | 15Y | 8.9R 60Y | ¹1.0 |
| 6 | 10% water containing 0.1% papain followed by 2% bleach | 2.2R | 20Y | 11.5R 70Y | 1.25 |
| 7 | 15% water ² containing 0.2% papain followed by 2% bleach | 2.4R | 22Y | 14.0R 70Y | 1.50 |
| 8 | 30% water ² containing 0.5% papain followed by 2% bleach | 2.4R | 30Y | 13.0R 70Y | 2.25 |

¹ Region of minimum odor and saponification color.
² In these runs additional water was used, because the papain used was in an aqueous dispersion (1 gram papain in 50 cc. water); 10% water would have given a similar result.

In contrast to the malodor of the fat treated as in runs 1 and 2 without enzyme, the results of runs 3 to 8 using the papain enzyme all show reduction of malodor.

As the concentration of enzyme in the fat is increased, the color of the treated fat and soap produced therefrom is effected.

EXAMPLE 7

To 1500 grams of a molten mixture of 80 parts by weight crude tallow and 20 parts by weight crude coconut oil were added 15 g. (1%) of the following composition:

| | Parts |
|---|---|
| Amyl dihydrogen phosphate | 45 |
| Cornstarch, crude | 90 |
| Natural Texas bentonite | 860 |

Nitrogen was passed through the stirred mixture and the temperature of the fat raised to 114–116° C. While steam was added, stirring continued for one hour, then 2% plant bleach (2% of the fat present) was added thereto and stirring again continued at 114–116° C. for 30 minutes. The now anhydrous mixture was filtered and the resulting fat exhibited 70% less malodors than the same fat treated with 2% clay-carbon mixture only.

EXAMPLE 8

An enzyme solution was prepared using 70 cc. of water, 70 mg. of papain enzyme and 1.4 grams Igepal CO 730 nonionic emulsifier. After the pH of this solution was adjusted to 5.0 with a few drops of hydrochloric acid it was added to 1400 g. of the molten 55–65° C. warm, catalytically deodorized fat mixture described in Example 7. The resultant emulsion was stirred overnight at 65–70° C., then 14 grams clay-carbon bleach added and the temperature gradually raised to 115° C. The mixture was stirred at 115–125° C. for 30 minutes and the now anhydrous fat filtered. A clear fat was obtained which had 90% less malodors than the same fat treated only with 2% of the same clay-carbon bleach, and less malodors than after the catalyst treatment only.

EXAMPLE 9

To 1500 g. of a molten mixture of 80 parts by weight crude tallow and 20 parts by weight crude coconut oil were added 15 grams (1%) of the following composition:

| | Parts |
|---|---|
| Butyl dihydrogen phosphate | 45 |
| Cornstarch, crude | 90 |
| Natural, acidic Texas bentonite | 860 |

Carbon dioxide was passed through the stirred mixture and the temperature of the fat raised to 114–116° C. Stirring was continued and steam added during one hour. Then the steam and the carbon dioxide were discontinued and the temperature lowered to 60–65° C. At this utes and filtered hot. A clear anhydrous fat was obtained which had 80% less malodors than the same fat treated with only 2% of the same clay-carbon bleach.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process of deodorizing materials consisting essentially of fats selected from the group consisting of animal fats, vegetable fats, and mixtures thereof, which process comprises the steps of:
 (a) mixing said fats at a pH of 3.5–7 with a nonionic emulsifier, a heavy metal sequestrant and an effective amount of an enzyme containing substance comprising proteolytic enzyme which is active at the pH and temperature of the fat in a molten state; and in a separate step
 (b) mixing with the molten fat, before or after the enzyme treatment, a deodorizing composition comprising a fat-soluble strong acid and a carbohydrate having at least one free hydroxyl group, said strong acid being selected from the group consisting of alpha-sulphopalmitic acid, alpha-sulfostearic acid, muco-chloride acid, acetylene dicarboxylic acid, maleic acid, and alkyl dihydrogen phosphates.

2. The process of claim 1 wherein the enzyme substance is in the form of an aqueous mixture.

3. The process of claim 1 wherein the proteolytic enzyme is active at a temperature of from 45 to 75° C.

4. The process of claim 1 wherein the proteolytic enzyme is active at a temperature of 50 to 60° C. and a pH of 4.5 to 5.5.

5. The process of claim 1 wherein the proteolytic enzyme is selected from the group consisting of ficin, papain, bromelin and fungal protease.

6. The process of claim 1 wherein the enzyme substance constitutes 0.001 to 0.1% by weight of the fat.

7. The process of claim 1 wherein the resultant enzyme—fat mixture is in contact with an adsorbent for odoriferous materials.

8. The process of claim 1 wherein said enzyme substance is a commercial mixture of various enzyme species.

9. The process of claim 1 wherein the carbohydrate is starch.

10. The process of claim 1 wherein the deodorizing composition contains a sequestering agent to reduce the activity of metal ions in the fat.

11. A process as defined by claim 1 further comprising the steps of heating the resultant fat mixed with the deodorizing composition to 100–125° C. for about 0.5–2 hours, and then adding sufficient base to neutralize residual acidic values.

12. A process as defined by claim 1 wherein said effective amount is determined by conducting a series of tests to obtain the amount of enzyme above which an increase in enzyme results in a worsening of color and odor in bleached saponified oil made from said enzyme-treated tallow.

13. A process as defined by claim 1 wherein said carbohydrate is a sugar selected from the group consisting of mono- and di-saccharides.

14. A process as defined by claim 1, wherein said carbohydrate is selected from the group consisting of a starch, pentose, hexose, maltose, and sucrose.

15. A process as defined by claim 1, wherein said deodorizing composition further comprises an acidic clay.

16. A process as defined by claim 15, wherein the deodorizing composition on a weight basis comprises 2–10% of said fat soluble strong acid, 3–15% of said carbohydrate, the balance being said clay.

17. The process of claim 2 wherein the aqueous enzyme mixture contains an activator for the enzyme.

18. The process of claim 2 wherein the pH of the enzyme mixture is adjusted to correspond to the pH of water in equilibrium with the fat.

19. The process of claim 2 wherein the aqueous medium for the enzyme constitutes 3 to 20% by weight of the fat.

20. The process of claim 2 wherein the resultant enzyme—fat mixture is heated above the boiling point of said aqueous mixture to form steam and carry off resulting volatile odor bodies.

21. A process as defined by claim 20 further comprising the steps of heating the resultant fat mixed with the deodorizing composition to 100–125° C. for about 0.5–2 hours, and then adding sufficient base to neutralize residual acidic values.

22. A process as defined by claim 21 wherein the deodorizing composition comprises on a weight basis 2–10% of said fat-soluble strong acid, 3–15% of said carbohydrate, and a predominant amount of an acidic clay.

23. A process as defined by claim 22 wherein said carbohydrate is starch.

24. The process of claim 23 wherein the deodorizing composition contains a sequestering agent to reduce the activity of metal ions in the fat.

25. In a process of deodorizing a material consisting essentially and predominantly of low grade tallow having been previously rendered in a separate operation, the step comprising:

mixing the tallow at a pH of 4.5–5.5 and a temperature of about 55–70° C., with an effective amount of an additive comprising a heavy metal sequestrant and an endopeptidase which is active at the pH and temperature of the tallow in a molten state thereby to obtain a fat of improved odor, said effective amount being determined by conducting a series of tests to obtain the amount of enzyme above which an increase in enzyme results in a worsening of color and odor in bleached saponified oil made from said enzyme treated tallow, said endopeptidase being added to the tallow in the form of an aqueous dispersion containing a non-ionic emulsifier.

References Cited

UNITED STATES PATENTS

| | | | |
|---|---|---|---|
| 1,922,484 | 8/1933 | Mapson et al. | 195—3 |
| 2,172,531 | 9/1939 | Ekhard | 195—3 |
| 2,397,874 | 4/1946 | Lloyd et al. | 195—3 |
| 2,527,305 | 10/1950 | Halmbacher | 195—3 |

FOREIGN PATENTS

| | | |
|---|---|---|
| 9,760 | 7/1933 | Australia. |
| 708,831 | 5/1954 | Great Britain. |

OTHER REFERENCES

Swern, Bailey's Industrial Oil and Fat Products, 3rd edition, p. 975, 1964.

Blank, Handbook of Food and Agriculture, Reinhold Publishing Corp., New York, pp. 264–268 (1955).

ALVIN E. TANENHOLTZ, Primary Examiner

U.S. Cl. X.R.

195—2, 63; 252—108; 260—424